Patented Nov. 6, 1973

3,770,779
SUBSTITUTED DINITROANILINES

Karl Kiehs, Lampertheim, Karl-Heinz Koenig, Frankenthal, and Adolf Fischer, Mutterstadt, Germany, assignors to Badische Anilin- & Soda-Fabrik Aktiengesellschaft, Ludwigshafen am Rhine, Germany
No Drawing. Filed Aug. 9, 1971, Ser. No. 170,278
Claims priority, application Germany, Sept. 2, 1970,
P 20 43 442.8
Int. Cl. C07c 117/00
U.S. Cl. 260—349    4 Claims

ABSTRACT OF THE DISCLOSURE

New and valuable substituted dinitroanilines having a good herbicidal action and a process for controlling the growth of unwanted plants with these compounds.

---

The present invention relates to new and valuable substituted dinitroanilines having a good herbicidal action and the use of these compounds as herbicides.

It is known to use 4-trifluoromethyl-2,6-dinitro-N,N-dipropylaniline as a herbicide. However, its action is not satisfactory.

We have now found that substituted dinitroanilines of the formula

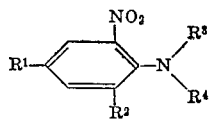

where one of the radicals $R^1$ and $R^2$ denotes nitro and the other denotes methyl, trifluoromethyl or methylsulfonyl, $R^3$ denotes bromoethyl, alkylthioalkyl (having up to 4 carbon atoms), azidoalkyl (preferably azidoethyl and 2-azidopropyl-1), acyloxyethyl or 2-acyloxypropyl (acetyl, propionyl, chloroacetyl, dichloroacetyl, trichloroacetyl, α-chloropropionyl, β-chloropropionyl, chlorocarbonyl, carbomethoxy, carbethoxy, N-methylcarbamoyl, N-ethylcarbamoyl), $R^4$ has the same meanings as $R^3$ and may additionally denote hydrogen or linear or branched alkyl, alkenyl or alkynyl each having up to 4 carbon atoms, hydroxyethyl, 2-hydroxypropyl, alkoxyalkyl (methoxyethyl, ethoxyethyl, 2-methoxypropyl, 2-ethoxypropyl) cyanomethyl, cyanoethyl or chloroethyl, and $R^3$ further denotes chloroethyl when $R^4$ denotes hydrogen, have a good herbicidal action.

The action is particularly in evidence on millet species when the compounds are used preemergence and at application rates of 0.5 to 3 kg. per hectare. The active ingredients are suitable for controlling unwanted plants in crops such as soya beans, cotton or Indian corn.

The new active ingredients are yellow crystalline substances or non-distillable oils.

The new compounds are produced in accordance with the following equation:

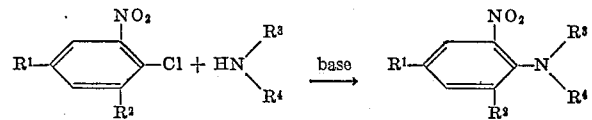

where $R^1$ and $R^2$ have the meanings given above and $R^3$ denotes hydroxyethyl or 2-hydroxypropyl, and $R^4$ denotes the same radicals as $R^3$ and additionally linear or branched alkyl, alkenyl or alkynyl each having up to 4 carbon atoms, alkoxyalkyl, cyanomethyl or cyanoethyl.

The compounds thus obtained may be reacted in conventional manner with halogenating agents ($COCl_2$, $SOCl_2$, $SOBr_2$, $PBr_3$) or acylating agents (acid chlorides, isocyanates) to give the products of the invention. Compounds in which $R^3$ denotes azidoalkyl are expediently produced by exchanging the azido radical for a halogen atom.

The suitably substituted secondary amines may also be reacted direct to form the products of the invention in accordance with the above equation.

Starting materials and intermediates may be produced for instance by the processes of U.S. Pats. 2,257,093 and 3,227,734 and in accordance with Journal of the Chemical Society, London, 1949, 190, suppl.

EXAMPLE 1

N-methylthioethyl-N-hydroxyethyl-2,6-dinitro-4-trifluoromethylaniline 54 parts (by weight) of 2,6-dinitro-4-trifluoromethyl-chlorobenzene is dissolved in 250 parts of tetrahydrofuran or benzene; subsequently, a mixture of 28.4 parts of N-methylthioethylaminoethanol and 20.2 parts of triethylamine is slowly added, and the whole is stirred for 2 hours at 50° to 60° C. After the triethylammonium hydrochloride has been filtered off, the filtrate is concentrated in vacuo and the residue recrystallized from ethanol. Melting point: 60° to 62° C.; yield: 96%.

EXAMPLE 2

N-methylthioethyl-N-chloroethyl-2,6-dinitro-4-trifluoromethylaniline 18.5 parts of the compound of Example 1 is dissolved in 100 parts of carbon tetrachloride or benzene; after a small amount of dimethylformamide or N-methylpyrrolidone has been added, 9 parts of thionyl chloride is slowly introduced at 10° to 15° C., and the whole stirred for 2 hours at room temperature and for a further 2 hours at 50° to 60° C. The excess thionyl chloride is distilled off with the solvent, the residue is taken up in carbon tetrachloride and washed with water. After concentration in vacuo, the crystalline product is obtained which is recrystallized from ethanol/ligroin. Melting point: 138° to 139° C.

EXAMPLE 3

N-propyl-N-β-azidoethyl-2,6-dinitro-4-methylsulfonylaniline 18.3 parts of N-n-propyl - N - β - chloroethyl - 2,6-dinitro - 4 - methyl-sulfonylaniline (M.P.: 115° to 117° C., prepared as under Example 2) and 3.6 parts of sodium azide are dissolved in 75 parts of dimethylformamide and the mixture is stirred for 4 hours at 70° to 80° C. After the reaction mixture has been cooled it is poured into ice water and the product extracted with methylene chloride. Refractive index of the end product: $n_D^{25}=1.5800$.

EXAMPLE 4

N-n-butyl-N-(β-chloroacetyloxy-n-propyl)-2,6-dinitro-4-trifluoromethylaniline 17.5 parts of N-n-butyl-N-β-hydroxy-n-propyl-2,6-dinitro-4-trifluoromethylaniline (M.P. 75° to 77° C.; prepared as in Example 1) is dissolved in 50 parts of toluene; 9.0 parts of chloroacetyl chloride is then slowly introduced. The mixture is then first stirred for 12 hours at room temperature, and for a further 3 hours at 40° to 50° C. The filtrated solution is concentrated in vacuo and the residue recrystallized from ethanol/ligroin. Melting point: 84° to 86° C.

EXAMPLE 5

N-methoxyethyl-N-chloroacetyloxyethyl-2,6-dinitro-4-methylaniline 22.5 parts of N-methoxyethyl-N-hydroxyethyl-2,6-dinitro-4-methylaniline (prepared as in Example 1 from 2,6-dinitro-4-methylchlorobenzene and N-methoxyethyl-N-hydroxyethylamine; M.P.: 40° to 42° C.) is reacted, as described in Example 4, with 10 parts of chloroacetyl chloride. An oily reaction product is obtained;

$$n_D^{25} = 1.5400.$$

EXAMPLE 6

N-allyl-N-chlorocarbonyloxyethyl-2,6-dinitro-4-trifluoromethylaniline 67 parts of N-allyl-N-hydroxyethyl - 2,6 - dinitro-4-trifluoromethylaniline (prepared as in Example 1;

$$n_D^{25} = 1.5350)$$

is dissolved in 100 parts of carbon tetrachloride; at room temperature phosgene is passed in, the temperature rising to approximately 40° C. After the reaction has subsided, the mixture is stirred for 30 minutes and subsequently concentrated; the residue is recrystallized from ethanol/ligroin. Melting point: 80° to 82° C.

EXAMPLE 7

N-methoxyethyl-N-(N-methylcarbamoyloxyethyl)-2,6-dinitro-4-trifluoromethylaniline 17.7 parts of N-methoxyethyl - N - hydroxyethyl-2,6-dinitro-4-trifloromethylaniline (prepared as in Example 1; M.P.: 35° to 37° C.) is dissolved in 50 parts of acetone; a few drops of triethylamine are added, and 3.1 parts of methyl isocyanate is introduced. The mixture is subsequently stirred for 3 hours at about 40° C., the solvent is then distilled off, the residue is taken up in methylene chloride, and the solution is washed with water and again concentrated. A dark oil is obtained. $n_D^{25}=1.5270$.

EXAMPLE 8

Methyl-β-(N-allyl-N-2,6-dinitro-4-trifluoromethylphenyl)-aminoethyl carbonate

At 10° to 20° C., 5.7 parts of methyl chloroformate is added to a solution of 16.8 parts of N-allyl-N-hydroxyethyl-2,6-dinitro-4-trifluoromethylaniline and 5 parts of triethylamine in 50 parts of chloroform; the mixture is stirred for 2 hours at room temperature and for 1 hour at from 40° to 50° C. The solution is then washed with water and concentrated. A dark oil is obtained. $n_D^{25}=1.5280$.

EXAMPLE 9

N-n-propyl-N-(β-bromoethyl)-2,6-dinitro-4-methylsulfonylaniline

At 20° to 25° C., 13.4 parts of thionyl bromide is added to a solution of 17.4 parts of N-n-propyl-N-hydroxyethyl - 2,6 - dinitro - 4 - methylsulfonylaniline (prepared as in Example 1; M.P.: 100° to 102° C.) and 1 part of dimethylformamide in 100 parts of carbon tetrachloride. The mixture is subsequently stirred for 6 hours at room temperature and for 4 hours at from 50° to 60° C. The solution is concentrated (12 mm. Hg) and the residue obtained is recrystallized from ethanol/ligroin. Melting point: 124° to 126° C.

The following compounds were prepared in the same way as in these examples:

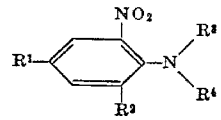

| No. | R¹ | R² | R⁴ | R³ | |
|---|---|---|---|---|---|
| 11 | CF₃ | NO₂ | n-C₃H₇ | CH₂—CH₂—S—C₂H₅ | |
| 12 | CF₃ | NO₂ | Allyl | CH₂—CH₂—S—CH₃ | |
| 13 | CH₃SO₂ | NO₂ | Allyl | CH₂—CH₂—S—CH₃ | |
| 14 | CF₃ | NO₂ | CH₂—CH₂—CN | CH₂—CH₂—SCH₃ | M.P. 69 to 70° C. |
| 15 | CF₃ | NO₂ | CH₂—CH₂—CN | CH₂—CH₂—S—C₂H₅ | M.P. 60 to 62° C. |
| 16 | CH₃SO₂ | NO₂ | CH₂—CH₂—CN | CH₂—CH₂—SCH₃ | M.P. 94 to 96° C. |
| 17 | CH₃SO₂ | NO₂ | CH₂—CH₂—SCH₃ | CH₂—CH₂—SCH₃ | |
| 18 | CH₃ | NO₂ | CH₂—CH₂—SCH₃ | CH₂—CH₂—SCH₃ | |
| 19 | NO₂ | CF₃ | CH₂—CH₂—SCH₃ | CH₂—CH₂—CN | |
| 20 | CF₃ | NO₂ | C₂H₅ | CH₂—CH₂—N₃ | M.P. 42 to 43° C. |
| 21 | CF₃ | NO₂ | n-C₃H₇ | CH₂—CH₂—N₃ | $n_D^{25}$ 1.5386 |
| 22 | CF₃ | NO₂ | Allyl | CH₂—CH₂—N₃ | |
| 23 | CF₃ | NO₂ | CH₂—CH₂—OCH₃ | CH₂—CH₂—N₃ | $n_D^{25}$ 1.5338 |
| 24 | CH₃ | NO₂ | n-C₃H₇ | CH₂—CH₂—N₃ | |
| 25 | CH₃ | NO₂ | Allyl | CH₂—CH₂—N₃ | |
| 26 | CF₃ | NO₂ | CH₂—CH₂—N₃ | CH₂—CH₂—Cl | |
| 27 | CH₃SO₂ | NO₂ | n-C₃H₇ | CH₂—CH₂—O—CONHCH₃ | |
| 28 | CH₃ | NO₂ | Allyl | CH₂—CH₂—O—CONHCH₃ | |
| 29 | CF₃ | NO₂ | CH—C≡CH | CH₂—CH₂—O—CONHCH₃ | |
| 30 | CF₃ | NO₂ | n-C₃H₇ | CH₂—CH₂—OCONHC₂H₅ | |
| 31 | CF₃ | NO₂ | n-C₃H₇ | CH₂—CH₂—O—CONH—CH₃ | $n_D^{25}$ 1.5330 |
| 32 | CF₃ | NO₂ | Allyl | CH₂—CH₂—O—CONHC₂H₅ | |
| 33 | CH₃SO₂ | NO₂ | Allyl | CH₂—CH₂—O—COCH₃ | |
| 34 | CF₃ | NO₂ | Allyl | CH₂—CH₂—O—COCH₃ | M.P. 55 to 57° C. |
| 35 | CF₃ | NO₂ | n-C₃H₇ | CH₂—CH₂—O—CO—C₂H₅ | $n_D^{25}$ 1.5161 |
| 36 | CH₃SO₂ | NO₂ | n-C₃H₇ | CH₂—CH₂—O—CO—C₂H₅ | |
| 37 | CF₃ | NO₂ | n-C₃H₇ | CH₂—CH₂—O—CO—CH₂Cl | |
| 38 | CF₃ | NO₂ | C₂H₅ | CH₂—CH₂—O—CO—CH₂Cl | $n_D^{25}$ 1.5225. |
| 39 | CH₃ | NO₂ | C₂H₅ | CH₂—CH₂—O—CO—CH₂Cl | |
| 40 | CF₃ | NO₂ | n-C₃H₇ | CH₂—CH₂—O—CO—CH₂Cl | $n_D^{25}$ 1.5273. |
| 41 | CH₃SO₂ | NO₂ | n-C₃H₇ | CH₂—CH₂—O—CO—CH₂Cl | $n_D^{25}$ 1.5760. |
| 42 | CH₃ | NO₂ | Allyl | CH₂—CH₂—O—CO—CH₂Cl | M.P. 60–62° C. |
| 43 | CH₃SO₂ | NO₂ | Allyl | CH₂—CH₂—O—CO—CH₂—Cl | |
| 44 | NO₂ | CF₃ | Allyl | CH₂—CH₂—O—CO—CH₂—Cl | |
| 45 | CF₃ | NO₂ | Allyl | CH₂—CH₂—O—CO—CH₂Cl | $n_D^{25}$ 1.5323 |
| 46 | CF₃ | NO₂ | CH₂—CH₂—OCH₃ | CH₂—CH₂—O—CO—CH₂Cl | $n_D^{25}$ 1.5220 |
| 47 | CH₃SO₂ | NO₂ | CH₂—CH₂—OCH₃ | CH₂—CH₂—O—CO—CH₂Cl | |
| 48 | CF₃ | NO₂ | CH₂—CH₂—O—COCH₂Cl | CH₂—CH₂—O—CO—CH₂Cl | M.P. 75–77° C. |
| 49 | CH₃SO₂ | NO₂ | CH₂—CH₂—O—COCH₂Cl | CH₂—CH₂—O—CO—CH₂Cl | |
| 50 | CF₃ | NO₂ | Allyl | CH₂—CH₂—O—COCH₂Cl | $n_D^{25}$ 1.5303 |
| 51 | CH₃SO₂ | NO₂ | n-C₃H₇ | CH₂—CH₂—O—COCH₂Cl | |
| 52 | CF₃ | NO₂ | n-C₃H₇ | CH₂—CH₂—O—COCH₂Cl | |
| 53 | CF₃ | NO₂ | C₂H₅ | CH₂—CH₂—O—COCH₃ | |
| 54 | CF₃ | NO₂ | CH₂—CH₂—S—CH₃ | CH₂—CH₂—O—COCH₂Cl | M.P. 70–72° C. |
| 55 | CH₃SO₂ | NO₂ | CH₂—CH₂—O—CH₃ | CH₂—CH₂—O—COCH₂Cl | |
| 56 | CF₃ | NO₂ | n-C₃H₇ | CH₂—CH₂O—COOCH₃ | |
| 57 | CF₃ | NO₂ | n-C₃H₇ | CH₂—CH₂—O—COOC₂H₅ | |
| 58 | CH₃SO₂ | NO₂ | n-C₃H₇ | CH₂—CH₂—O—COOCH₃ | |
| 59 | CH₃ | NO₂ | n-C₃H₇ | CH₂—CH₂—O—COOCH₃ | |
| 60 | CH₃ | NO₂ | CH₂—CH₂—CN | CH₂—CH₂—O—COOCH₃ | |
| 61 | CF₃ | NO₂ | CH₂—CH₂—CN | CH₂—CH₂—O—COOCH₃ | |
| 62 | CF₃ | NO₂ | CH₂—CH₂—O—COOCH₃ | CH₂—CH₂—O—COOCH₃ | |
| 63 | CH₃SO₂ | NO₂ | CH₂—CH₂—O—COOCH₃ | CH₂—CH₂—O—COOCH₃ | |
| 64 | CH₃ | NO₂ | CH₂—CH₂—O—COOCH₃ | CH₂—CH₂—O—COOCH₃ | |

| No. | R¹ | R² | R⁴ | R³ | |
|---|---|---|---|---|---|
| 65 | $CF_3$ | $NO_2$ | $C_2H_5$ | $CH_2-CH_2Br$ | M.P. 95–97° C. |
| 66 | $CF_3$ | $NO_2$ | n-$C_3H_7$ | $CH_2-CH_2Br$ | $n_D^{25}$ 1.5425 |
| 67 | $CF_3$ | $NO_2$ | $CH_2-CH_2-OCH_3$ | $CH_2-CH_2Br$ | M.P. 70–72° C. |
| 68 | $CH_3SO_2$ | $NO_2$ | n-$C_3H_7$ | $CH_2-CH_2Br$ | M.P. 124–126° C. |
| 69 | $CH_3$ | $NO_2$ | n-$C_3H_7$ | $CH_2-CH_2Br$ | |
| 70 | $CF_3$ | $NO_2$ | $CH_2-CH_2CN$ | $CH_2-CH_2Br$ | |
| 71 | $CH_3SO_2$ | $NO_2$ | $CH_2-CH_2CN$ | $CH_2-CH_2Br$ | |
| 72 | $CH_3SO_2$ | $NO_2$ | $CH_2-CH_2-SCH_3$ | $CH_2-CH_2Br$ | |
| 73 | $CF_3$ | $NO_2$ | Allyl | $CH_2-CH_2Br$ | |
| 74 | $CF_3$ | $NO_2$ | $CH_2-CH_2-O-COCH_3$ | H | |
| 75 | $CF_3$ | $NO_2$ | $CH_2-CH_2-O-CO-CH_2-Cl$ | H | M.P. 87–88° C. |
| 76 | $CF_3$ | $NO_2$ | $CH_2-CH_2-O-CO-C_2H_5$ | H | |
| 77 | $CF_3$ | $NO_2$ | $CH_2-CH_2-O-CO-CH_2-CH_2Cl$ | H | |
| 78 | $CF_3$ | $NO_2$ | $CH_2-CH_2-O-CONHCH_3$ | H | M.P. 107 to 108° C. |
| 79 | $CF_3$ | $NO_2$ | $CH_2-CH_2-O-CONHC_2H_5$ | H | |
| 80 | $CF_3$ | $NO_2$ | $CH_2-CH_2-O-COOC_2H_5$ | H | |
| 81 | $CF_3$ | $NO_2$ | $CH_2-CH(CH_3)-OCOCH_2Cl$ | H | |
| 82 | $CF_3$ | $NO_2$ | $CH_2-CH(CH_3)-OCONHCH_3$ | H | |
| 83 | $CF_3$ | $NO_2$ | $CH_2-CH_2-Cl$ | H | M.P. 68 to 70° C. |
| 84 | $CF_3$ | $NO_2$ | $CH_2-CH_2-Br$ | H | |
| 85 | $CF_3$ | $NO_2$ | $CH_2-CH_2-N_3$ | H | |
| 86 | $CH_3SO_2$ | $NO_2$ | $CH_2-CH_2-Cl$ | H | |
| 87 | $CH_3SO_2$ | $NO_2$ | $CH_2-CH_2-Br$ | H | |
| 88 | $CH_3SO_2$ | $NO_2$ | $CH_2-CH_2-O-CONHCH_3$ | H | |
| 89 | $CH_3SO_2$ | $NO_2$ | $CH_2-CH_2-O-CONHC_2H_5$ | H | |
| 90 | $CH_3SO_2$ | $NO_2$ | $CH_2-CH(CH_3)OCOCH_2Cl$ | H | |
| 91 | $CH_3SO_2$ | $NO_2$ | $CH_2-CH(CH_3)O-COC_2H_5$ | H | |
| 92 | $CH_3SO_2$ | $NO_2$ | $CH_2-CH_2-O-COCH_3$ | H | |
| 93 | $CH_3SO_2$ | $NO_2$ | $CH_2-CH_2-O-COCH_2Cl$ | H | |
| 94 | $CH_3SO_2$ | $NO_2$ | $CH_2-CH_2-S-C_2H_5$ | H | |
| 95 | $CH_3SO_2$ | $NO_2$ | $CH_2-CH(CH_3)O-COCH_3$ | n-$C_3H_7$ | |
| 96 | $CF_3$ | $NO_2$ | $CH_2-CH(CH_3)-O-CONHCH_3$ | n-$C_3H_7$ | |
| 97 | $CF_3$ | $NO_2$ | $CH_2-CH(CH_3)-O-COCH_2Cl$ | n-$C_3H_7$ | |
| 98 | $CH_3$ | $NO_2$ | $CH_2-CH_2-O-COCH_2Cl$ | n-$C_3H_7$ | $n_D^{25}$ 1.5360 |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following experiments demonstrate the biological action of the new compounds.

EXAMPLE 10

In a greenhouse, loamy sandy soil was filled into pots and sown with Zea mays, Soja hispida, Gossypium hirsutum, Echinochloa crus-galli, Digitaria sanguinalis, Setaria spec., Lolium perenne, Poa annua and Alopecurus myosuroides.

The soil prepared in this manner was then treated with 3 kg. per hectare of each of the following active ingredients, each amount being dispersed in 500 liters of water per hectare:

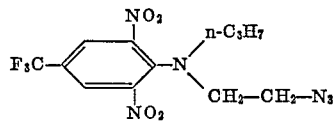

(II) N-β-methoxyethyl-N-β-azidoethyl-2,6-dinitro-4-trifluoromethylaniline (III) N-ethyl-N-β-azidoethyl-2,6-dinitro-4-trifluoromethylaniline and, for comparison, (IV) 4-trifluoromethyl-2,6-dinitro-N,N-dipropylaniline.

After 3 weeks, I, II and III had, compared with IV, far superior compatibility with the crop plants, combined with a much better herbicidal action.

| | Active ingredient | | | |
|---|---|---|---|---|
| | I | II | III | IV |
| Crop plants: | | | | |
| Soja hispida | 0 | 0 | 0 | 30 |
| Gossypium hirsutum | 0 | 0 | 0 | 5 |
| Zea mays | 5 | 0 | 10 | 35 |
| Unwanted plants: | | | | |
| Echinochloa crus-galli | 100 | 100 | 100 | 95 |
| Digitaria sanguinalis | 100 | 100 | 100 | 90 |
| Setaria spec | 95 | 95 | 95 | 80 |
| Lolium perenne | 100 | 90 | 95 | 90 |
| Poa annua | 100 | 100 | 100 | 100 |
| Alopecurus myosuroides | 100 | 100 | 100 | 95 |

NOTE.—0=No damage; 100=Complete destruction.

EXAMPLE 11

In a greenhouse, loamy sandy soil was filled into pots and sown with Zea mays, Gossypium hirsutum, Soja hispida, Poa trivialis, Lolium multiflorum, Echinochloa crus-galli, Digitaria sanguinalis and Setaria spec.

The soil was then treated with 3 kg. per hectare of each of the following active ingredients, each amount being dispersed in 500 liters of water per hectare:

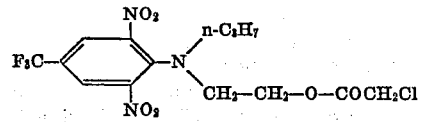

(II) N-β-(methylcarbamoyloxy)-ethyl-2,6-dinitro-4-fluoromethylaniline (III) N-β-(chloroacetoxy)-ethyl-2,6-dinitro-4-trifluoromethylaniline (IV) N,N-bis-[β-γ-(chloroacetoxy)-ethyl]-2,6-dinitro-4-trifluoromethylaniline and, for comparison, (V) 4-trifluoromethyl-2,6-dinitro-N,N-dipropylaniline.

After 3 weeks I, II, III and IV had, compared with V, superior compatibility with the crop plants combined with a good herbicidal action.

| | Active Ingredient | | | | |
|---|---|---|---|---|---|
| | I | II | III | IV | V |
| Crop plants: | | | | | |
| Zea mays | 0 | 0 | 0 | 0 | 35 |
| Gossypium hirsutum | 0 | 0 | 0 | 0 | 5 |
| Soja hispida | 0 | 0 | 0 | 0 | 30 |
| Unwanted plants: | | | | | |
| Poa trivialis | 95 | 80 | 75 | 75 | 95 |
| Lolium multiflorum | 90 | 75 | 70 | 70 | 90 |
| Echinochloa crus-galli | 90 | 80 | 75 | 75 | 95 |
| Digitaria sanguinalis | 85 | 75 | 70 | 70 | 90 |
| Setaria spec | 80 | 75 | 70 | 70 | 80 |

NOTE.—0=No damage; 100=Complete destruction.

The action of the following compounds corresponds to that of I, II and III:

N-propyl-N-$\beta$-azidoethyl-2,6-dinitro-4-methylsulfonylaniline;

N-$\beta$-methylmeracaptoethyl-N-$\beta$-(chloroacetoxy)-ethyl-2,6-dinitro-4-trifluoromethylaniline;

4-methyl-2,6-dinitro-N-n-propyl-N-$\beta$-azidoethylaniline;

4-methyl-2,6-dinitro-N-n-propyl-N-$\beta$-(chloroacetoxy)-ethylaniline;

4-methylsulfonyl-2,6-dinitro-N-n-propyl-N-$\beta$-(methoxycarboxy)-ethylaniline;

4-trifluoromethyl-2,6-dinitro-N-propyl-N-$\beta$-(chloroacetoxy)-propylaniline;

4-trifluoromethyl-2,6-dinitro-N-propyl-N-$\beta$-(N'-methylcarbamoyloxy)-propylaniline;

N-propyl-N-$\beta$-bromoethyl-2,6-dinitro-4-methylsulfonylaniline;

N-$\beta$-methoxyethyl-N-$\beta$-bromoethyl-2,6-dinitro-4-trifluoromethylaniline.

EXAMPLE 12

90 parts by weight of the compound of Example 1 is mixed with 10 parts by weight of N-methyl-$\alpha$-pyrrolidone. A mixture is obtained which is suitable for application in the form of very fine drops.

EXAMPLE 13

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 14

20 parts by weight of the compound of Example 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 15

20 parts by weight of the compound of Example 4 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 16

20 parts by weight of the compound of Example 5 is well mixed with 3 parts by weight of the sodium salt of diisobutylnaphthalene-$\alpha$-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 17

3 parts by weight of the compound of Example 6 is intimately mixed with 97 parts by weight of particulate kaolin. A dust is obtained containing 3% by weight of the active ingredient.

EXAMPLE 18

30 parts by weight of the compound of Example 7 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted dinitroaniline of the formula

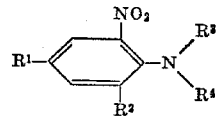

where one of the radicals $R^1$ and $R^2$ denotes nitro and the other denotes methyl, trifluoromethyl or methylsulfonyl, $R^3$ denotes azido lower alkyl, and $R^4$ is a member selected from the group consisting of hydrogen, alkyl having up to 4 carbon atoms, alkenyl having up to 4 carbon atoms, alkynyl having up to 4 carbon atoms, hydroxyethyl, hydroxypropyl, lower alkoxy lower alkyl, bromoethyl and chloroethyl.

2. 4-trifluoromethyl-2,6-dinitro - N - n - propyl-N-$\beta$-azidoethylaniline.

3. 4-trifluoromethyl-2,6-dinitro - N - $\beta$ - methoxyethyl-N-$\beta$-azidoethylaniline.

4. 4-trifluoromethyl-2,6-dinitro-N-ethyl - N - azidoethylaniline.

References Cited

Bouton, A. J. et al.: C.A., vol. 65 (1966), p. 20119e.

HENRY R. JILES, Primary Examiner

M. A. M. CROWDER, Assistant Examiner

U.S. Cl. X.R.

424—226

UNITED STATES PATENT OFFICE
CERTIFICATE OF CORRECTION

Patent No. 3,770,779           Dated November 6, 1973

Inventor(s) Karl Kiehs et al

It is certified that error appears in the above-identified patent and that said Letters Patent are hereby corrected as shown below:

Column 1, line 44, "2-hydroxyropyl" should read -- 2-hydroxypropyl --.

Column 6, line 44, "sanquinalis" should read -- sanguinalis --.

Column 6, line 65-66, "4-fluoromethylaniline" should read -- 4-trifluoromethylaniline --.

Column 7, line 9, "sanquinalis" should read -- sanguinalis --.

Column 7, line 19, "methylmeracaptoethyl" should read -- methylmercaptoethyl --.

Signed and sealed this 29th day of October 1974.

(SEAL)
Attest:

McCOY M. GIBSON JR.
Attesting Officer

C. MARSHALL DANN
Commissioner of Patents